(12) United States Patent
Sampson et al.

(10) Patent No.: US 11,341,698 B1
(45) Date of Patent: May 24, 2022

(54) METHODS AND APPARATUS FOR SIMULATING IMAGES OF PRODUCE WITH MARKINGS FROM IMAGES OF PRODUCE AND IMAGES OF MARKINGS

(71) Applicant: Tiliter Pty Ltd., Sydney (AU)

(72) Inventors: Christopher Bradley Rodney Sampson, Sydney (AU); Khai Van Do, Sydney (AU)

(73) Assignee: Tiliter Pty Ltd., Sydney (AU)

(*) Notice: Subject to any disclaimer, the term of this patent is extended or adjusted under 35 U.S.C. 154(b) by 0 days.

(21) Appl. No.: 17/127,097

(22) Filed: Dec. 18, 2020

(51) Int. Cl.
*G06T 11/60* (2006.01)
*G06T 5/00* (2006.01)
(Continued)

(52) U.S. Cl.
CPC ........... *G06T 11/60* (2013.01); *G06K 9/6256* (2013.01); *G06N 3/08* (2013.01); *G06T 3/40* (2013.01); *G06T 3/608* (2013.01); *G06T 5/002* (2013.01); *G06T 5/20* (2013.01); *G06T 5/50* (2013.01); *G06T 11/001* (2013.01); *G06T 2207/20081* (2013.01); *G06T 2207/20084* (2013.01); *G06T 2207/20212* (2013.01); *G06T 2210/22* (2013.01); *G06V 20/68* (2022.01)

(58) Field of Classification Search
CPC . G06T 11/60; G06T 3/40; G06T 3/608; G06T 5/002; G06T 5/20; G06T 5/50; G06T 11/001; G06T 2207/20081; G06T 2207/20084; G06T 2207/20212; G06T 2210/22; G06K 9/6256; G06N 3/08
See application file for complete search history.

(56) References Cited

U.S. PATENT DOCUMENTS 9,317,973 B2 * 4/2016 Choukroun ............. G06T 7/149
10,664,722 B1    5/2020 Sharma et al.
(Continued)

FOREIGN PATENT DOCUMENTS

CN    111814660 A    10/2020

OTHER PUBLICATIONS

OpenCV, "Color conversions," [Online], Retrieved from the Internet: URL: https://docs.opencv.org/3.4/de/d25/imgproc_color_conversions.html, 2013, 4 pages.
(Continued)

*Primary Examiner* — David T Welch
(74) *Attorney, Agent, or Firm* — Cooley LLP (57) ABSTRACT

In some embodiments, a method includes receiving an image of produce and an image of marking. The image of produce has a set of pixels, each associated with a position and a color value. The method further includes generating a grayscale image from the image of produce. The method further includes cropping out a portion from the grayscale image. The method further includes locating a marking position pixel on the image of produce by: (a) producing a list of pixels that are part of the cropped portion, (b) selecting, from the list of pixels, a subset of pixels having grayscale pixel values above a threshold, and (c) randomly selecting the marking position pixel from the subset of pixels. The method further includes overlaying the image of marking on the image of produce by coinciding a pixel of the image of marking with the marker position pixel.

20 Claims, 3 Drawing Sheets

(51) Int. Cl.
*G06T 5/20* (2006.01)
*G06T 5/50* (2006.01)
*G06T 3/40* (2006.01)
*G06T 3/60* (2006.01)
*G06K 9/62* (2022.01)
*G06N 3/08* (2006.01)
*G06T 11/00* (2006.01)
*G06V 20/68* (2022.01)

(56) References Cited

U.S. PATENT DOCUMENTS

| | | | |
|---|---|---|---|
| 2007/0222207 A1* | 9/2007 | Hendry | G09F 3/02 283/101 |
| 2015/0012426 A1* | 1/2015 | Purves | G06Q 20/321 705/41 |
| 2015/0379422 A1 | 12/2015 | Chandler | |
| 2016/0063734 A1* | 3/2016 | Divakaran | G06K 9/4642 382/110 |
| 2016/0180600 A1 | 6/2016 | Liu | |
| 2018/0239989 A1* | 8/2018 | Pan | G06K 9/70 |
| 2019/0213443 A1* | 7/2019 | Cunningham | G06K 9/78 |
| 2019/0236362 A1 | 8/2019 | Srivastava et al. | |
| 2019/0325269 A1 | 10/2019 | Bagherinezhad et al. | |
| 2019/0384954 A1* | 12/2019 | Lyubimov | G06K 9/6202 |
| 2020/0184278 A1* | 6/2020 | Zadeh | G06F 16/43 |
| 2020/0226807 A1 | 7/2020 | Walters et al. | |
| 2020/0302510 A1* | 9/2020 | Chachek | G06K 9/00671 |
| 2020/0364501 A1 | 11/2020 | Herz et al. | |
| 2020/0372228 A1* | 11/2020 | Rodriguez | G06Q 20/208 |
| 2020/0379427 A1* | 12/2020 | Tao | G06F 9/3009 |
| 2021/0225052 A1* | 7/2021 | Marzorati | G06T 11/60 |
| 2021/0233249 A1* | 7/2021 | Barish | G09F 3/02 283/101 |
| 2021/0319501 A1* | 10/2021 | Dollens | G06K 9/4642 382/110 |
| 2021/0374373 A1* | 12/2021 | Astvatsaturov | G06F 9/3009 |

OTHER PUBLICATIONS

International Search Report and Written Opinion for International Application No. PCT/IB2021/062050, dated Mar. 11, 2022, 9 pages.

* cited by examiner

METHODS AND APPARATUS FOR SIMULATING IMAGES OF PRODUCE WITH MARKINGS FROM IMAGES OF PRODUCE AND IMAGES OF MARKINGS

TECHNICAL FIELD

The present disclosure relates to the field of image processing, and in particular to apparatus and methods for using image processing to simulate realistic synthetic produce images with markings from images of produce and images of markings.

BACKGROUND

Simulation of images can be useful in many applications. For example, simulation of images can be used for photo editing, social media posts, commercial ads, image processing, and/or the like. Known devices and methods for simulation of images, however, often involve manual tasks performed by photo editing professionals. Using professionals for simulation of images, however, can quickly become time consuming and costly when a large number of simulated images is desired. Thus, a need exists for apparatus and methods for image simulation.

SUMMARY

In some embodiments, a method includes receiving an image of produce and an image of marking. The image of produce has a set of pixels, each associated with a position and a color value. The method further includes generating a grayscale image from the image of produce. The method further includes cropping out a portion from the grayscale image. The method further includes locating a marking position pixel on the image of produce by: (a) producing a list of pixels that are part of the cropped portion, (b) selecting, from the list of pixels, a subset of pixels that have grayscale pixel values above a threshold, and (c) randomly selecting the marking position pixel from the subset of pixels. The method further includes overlaying the image of marking on the image of produce by coinciding a pixel of the image of marking with the marking position pixel.

DETAILED DESCRIPTION

Non-limiting examples of various aspects and variations of the embodiments are described herein and illustrated in the accompanying drawings.

Simulation of synthetic images that combine images (e.g., overly images) are often performed manually by photo editing professionals using photo editing devices and/or software. In some applications such as training deep learning models, however, numerous images (e.g., thousands, millions, and/or the like) are often used to train a reliable deep learning model. Using photo editing professionals to generate the numerous images to train the deep learning models can become very costly or not possible/practical. The image simulation devices and methods presented herein can automatically generate or simulate realistic synthetic images that are suitable for training the deep learning models and produced in a cost-effective and possible/practical manner. The deep learning models trained based on the synthetic images can be used in image classification, item recognition in images, information extraction from images, and/or the like.

Described herein are image simulation devices and methods that are suitable for reliable generation of synthetic images of produce with marking based on images of produce and images of markings. Thereafter, synthetic images of produce can be used in training models (e.g., machine learning models).

While the methods and apparatus are described herein as processing data from a set of files, a set of images, a set of videos, a set of databases, and/or the like, in some instances an image simulation device (e.g., image simulation device 101 discussed below in connection with FIG. 1) can be used to generate the set of files, the set of images, the set of videos, and/or the set of databases. Therefore, the image simulation device can be used to process and/or generate any collection or stream of data. As an example, the image simulation device can process and/or generate an image(s) of produce, an image(s) of marking(s), a video(s) of produce, a video(s) of marking(s), and/or the like.

Figure 1:
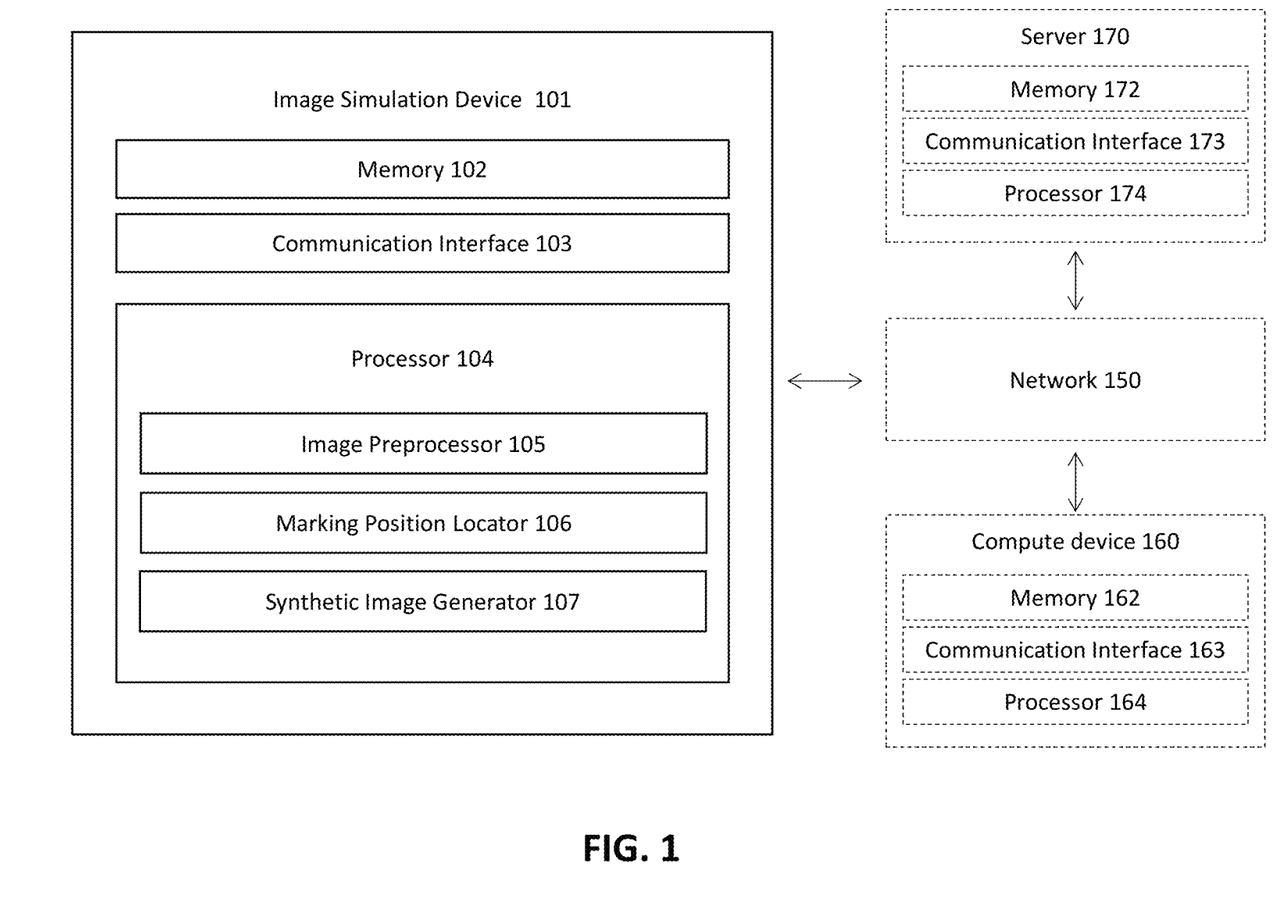
FIG. 1 is a schematic description of an image simulation device, according to an embodiment.

FIG. 1 is a schematic description of an image simulation device 101, according to an embodiment. The image simulation device 101 includes hardware and/or software to perform (or execute) an image preprocessor 105, a marking position locator 106, and/or a synthetic image generator 107. The image simulation device 101 can receive a set of images of a first type (e.g., images of produce) and a set of images of a second type (e.g., images of markings) and use the image preprocessor 105, the marking position locator 106, and/or the synthetic image generator 107 collectively to generate a set of synthetic images.

Optionally, in some implementations, the image simulation device 101 can be operatively coupled to a compute device 160 and/or a server 170 to transmit and/or receive data (e.g., images of the first type, images of the second type, synthetic images, and/or the like) and/or analytical models (e.g., a copy of the marking position locator 106) via a network 150. The compute device 160 and/or the server 170 can provide storage for the data, execute the analytical models, and/or execute additional analysis on the data (e.g., training a deep learning model using the data). The compute device 160 and the server 170 each can be or include a hardware-based computing device and/or a multimedia device, such as, for example, a server, a workstation, a computer, a desktop, a laptop, a smartphone, a tablet, a wearable compute device, and/or the like.

The image simulation device 101 includes a memory 102, a communication interface 103, and a processor 104. In some implementations, the image simulation device 101 can receive data including the first set of images of the first type (e.g., images of produce, images of meat, images of pastry, and/or the like) and/or the second set of images of the second type (e.g., images of organic type markings, images of price tags, images of barcodes, images of expiry dates, and/or the like) from a data source(s). In some examples disclosed herein, the second set of images of the second type include images of organic type markings. Such images of organic type markings can include images of organic types written in any natural language (e.g., English, Chinese, Hindi, and/or the like), images of organic labels encoding a pattern (e.g., a bar code) that represents organic types, images of organic label having a design that represents organic types, and/or the like. The data source(s) can be or include, for example, an external hard drive (not shown), the compute device 160, the server 170, and/or the like, operatively coupled to the image simulation device 101. In some instances, the image simulation device 101 can receive a set of videos from the data source(s) and analyze the set of videos frame by frame to generate the first set of images and/or the second set of images.

The memory 102 of the image simulation device 101 can be, for example, a memory buffer, a random access memory (RAM), a read-only memory (ROM), a hard drive, a flash drive, a secure digital (SD) memory card, an external hard drive, an erasable programmable read-only memory (EPROM), an embedded multi-time programmable (MTP) memory, an embedded multi-media card (eMMC), a universal flash storage (UFS) device, and/or the like. The memory 102 can store, for example, the first set of images, the second set of images, the set of synthetic images, the analytical model(s), and/or codes that includes instructions to cause the processor 104 to perform one or more processes or functions described herein (e.g., the marking position locator 106).

The communication interface 103 of the image simulation device 101 can be a hardware component of the image simulation device 101 to facilitate data communication between the image simulation device 101 and external devices (e.g., the compute device 160, the server 170) or internal components of the image simulation device 101 (e.g., the memory 102, the processor 104). The communication interface 103 is operatively coupled to and used by the processor 104 and/or the memory 102. The communication interface 103 can be, for example, a network interface card (NIC), a Wi-Fi® module, a Bluetooth® module, an optical communication module, and/or any other suitable wired and/or wireless communication interface. The communication interface 103 can be configured to connect the image simulation device 101 to the network 150. In some instances, the communication interface 103 can facilitate receiving or transmitting data (e.g., the first set of images, the second set of images, the set of synthetic images, and/or the analytical model(s)) via the network 150. For example, in some implementations, the communication interface 103 can facilitate transmitting the first set of images and the set of synthetic images to the server 170, which is configured to train a deep learning model based on the first set of images and the set of synthetic images.

The processor 104 can be, for example, a hardware based integrated circuit (IC) or any other suitable processing device configured to run or execute a set of instructions or a set of codes. For example, the processor 104 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 104 can be operatively coupled to the memory 102 and/or communication interface 103 through a system bus (for example, address bus, data bus, and/or control bus; not shown).

The processor 104 includes (e.g., implemented as a hardware and/or loaded to a memory unit of the processor 104) the image preprocessor 105, the marking position locator 106, and the synthetic image generator 107. In one example, code to cause the marking position locator 106 to generate a coordinate for a marking can be stored in the memory 102, loaded from the memory to the processor 104, and executed by an arithmetic and logic unit of the processor 104. Alternatively, either or all of the image preprocessor 105, the marking position locator 106, and the synthetic image generator 107 can be a hardware-based device. For example, a process to cause the synthetic image generator 107 to generate a synthetic image can be implemented on an individual integrated circuit chip.

The image preprocessor 105 can receive and prepare the first set of images of the first type (e.g., images of produce) and the second set of images of the second type (e.g., images of markings) for generating the set of synthetic images. Preparing the first set of images of the first type and the second set of images of the second type can include image augmentation. In some instances, augmenting an image involves applying a filter. In one example, a low pass filter can be used on the image to remove high spatial frequency noise from the image for smoothing. In another example, a high pass filter can be used on the image for edge detection and sharpening the image. Yet in another example, a noise filter (e.g., a random noise filter, a Gaussian noise filter, and/or the like) can be used on the image. Preparing the first set of images of the first type and the second set of images of the second type can include cropping images (e.g., to resize the images to a common image size). In some instances, the image preprocessor 105 can resize the first set of images of the first type to a first preset size and the second set of images of the second type to a second preset size. For example, the image processor 105 can resize images of produce to 600 pixels by 600 pixels image size and resize images of markings to 30 pixels by 30 pixels images size.

In some instances, the image preprocessor 105 can skew or rotate the first set of images of the first type by a first angle of skew and the second set of images of the second type by a second angle of skew. For example, the image processor 105 can skew images of produce by a first random angle of skew between −10 to 10 degrees and skew images of markings by a second random angle of skew between −180 to 180 degrees. In some instances, image preprocessor 105 can color cast the first set of images of the first type by a first color and the second set of images of the second type by a second color. In some instances, image preprocessor 105 can normalize images to a common scale, a common file format, a common image size, common color intensity intervals, and/or the like. Normalizing the images can help the image simulation device 101 to analyze the images in a streamline and cost-efficient manner.

Each image of the first type from the first set of images of the first type has a set of pixels. Each pixel of an image of the first type is associated with a position (e.g., a cartesian coordinate) on that image and a color value associated to that pixel. The image preprocessor 105 converts the first set of images of the first type (e.g., images of produce) from a color format (e.g., a blue-green-red (BGR) color format, a red-green-blue (RGB) color format, and/or the like) to a grayscale image with a grayscale format (an 8-bit grayscale format, a 16-bit grayscale format, and/or the like). The image preprocessor 105 converts each pixel of an image from the first set of images of the first type to a grayscale pixel of the grayscale image using:

$$Y = C_1 R + C_2 G + C_3 B$$

where Y represents a gray intensity value of a pixel, and R, G, and B represents values for red intensity value, green intensity value, and blue intensity value of that pixel, respectively. Moreover $C_1$, $C_2$, and $C_3$ represent multiplicand factors for R, G, and B, respectively.

In some implementation, the multiplicand factors $C_1$, $C_2$, and $C_3$ are preset (or predetermined) numbers. In particular, in some instances, the image preprocessor 105 can convert a pixel of an image from the first set of images of the first type to a grayscale pixel of the grayscale image using:

$$Y=0.299R+0.587G+0.114B$$

The above relation assigns a low multiplicand factor to blue intensity values, in part, because blue background is less likely to dominate images of produce and there are not many blue fruits and/or blue vegetables. Therefore, the above relation can be used to achieve an estimate coordinate for portions of an image of produce showing the produce. Although, such relations (formulas) are not absolute, in the sense that they do not provide a 100% accuracy for locating the portions of the image of produce showing the produce, the relations (formulas) and methods described herein empirically achieve reliable estimates. In some implementation, the multiplicand factors $C_1$, $C_2$, and $C_3$ are dynamically determined numbers based on a distribution of red intensity values, green intensity values, and blue intensity values present in the image.

In addition, the image preprocessor 105 can extract (e.g., by cropping) an area (e.g., a centered area) of the image to generate a cropped portion. The area can be determined such that after overlaying an image of marking (e.g., an image of a sticker, a price tag, and/or the like) on an image of produce (e.g., an image of a watermelon, an image of an orange, and/or the like), no pixel from the image of marking will be positioned outside the image of produce. In other words, the area of the image can be determined by removing a padding area around the image of produce. The padding area around the image can be defined by an area inside of the image that has a width equal to or larger than largest dimension of the image of marking.

The marking position locator 106 can locate a marking position pixel on the image of produce largely by: (a) producing a list of pixels, (b) selecting a subset of pixels, and (c) randomly selecting the marking position pixel. The list of pixels can be produced from grayscale pixels of the grayscale image generated by the image preprocessor 105 that are part of the cropped portion. Each pixel in the list of pixels has a position (e.g., a coordinate) and a grayscale pixel value. The subset of pixels can be selected from the list of pixels by determining a threshold and selecting pixels having grayscale pixel intensity values above the threshold.

In some implementations, the threshold value can be a preset (or predetermined) value. In some implementations, the threshold can be determined based on a statistical distribution of grayscale pixel values of the list of grayscale pixels. For example, the threshold value can be selected to be the three-sigma limit of the statistical distribution of grayscale pixel values of the list of grayscale pixels. Therefore, any pixel having a grayscale pixel value above the three-sigma limit of the statistical distribution of grayscale pixel values can be selected among the subset of pixels. The marking position pixel can then be selected randomly from the subset of pixels. Thereafter, the marking position pixel that is chosen randomly can be used as a reference point to place the image of marking on the image of produce.

In some implementations, the list of pixels can be ordered in the list based on positions of pixels in the cropped portion. The marking position locator 106 can generate a weighted subset of pixels based on the subset of pixels and a position of each pixel in the subset of pixels. For example, in some instances, a position closer to center of an image of produce can be associated with a larger weight to increase a likelihood of the pixel being selected. The marking position locator 106 can then randomly select (i.e., a weighted random choice) the marking position pixel from the weighted subset of pixels.

The synthetic image generator 107 overlays the image of marking on the image of produce by coinciding a pixel of the image of marking with the marking position pixel of the image of produce, to generate a simulated image of produce. In some implementations, the pixel of the image of marking can be selected randomly, and the image of marking can be padded by a padding size prior to overlaying the image of marking on the image of produce. The padding size can be determined based on a position of the pixel of the image of marking and/or a size of the image of marking. For example, the image of marking can have a length of 20 pixels and a width of 10 pixels. Furthermore, the position of the pixel of the image of marking can be at a coordinate of (3, 3) from the bottom left corner of the image of the marking. The padding size can be defined, for example, to be 10% of the length of the image of marking but not to exceed any element of the coordinate. In this example, the padding size can assume a length of 2 and width of 1 pixel. In some implementations, the pixel of the image of marking can be a predetermined pixel (e.g., a central pixel of the image of marking).

In some implementations, the image simulation device 101 can optionally transmit (e.g., after generating) the set of synthetic images to the compute device 160 and/or the server device 170. In some instances, the compute device 160 and/or the server device 170 can use the set of synthetic images to train a machine learning model and use the trained machine learning model to automatically recognize (without human intervention) produce and markings on the produce. In some instances, the compute device 160 and/or the server device 170 can store the set of synthetic images.

The compute device 160 can be or include a hardware-based computing device and/or a multimedia device operatively coupled to the image simulation device 101 (e.g., through network 150). The compute device 160 can transmit and/or receive the first set of images of the first type and the second set of images of the second type and/or analytical models (e.g., a copy of the marking position locator) to/from the image simulation device 101. The compute device can include a memory 162, a communication interface 163 and/or a processor 164 that are structurally and/or functionally similar to the memory 102, the communication interface 103 and/or the processor 104 as shown and described with respect to the image simulation device 101. In some implementations, however, the memory 162 and/or the processor 164 can include application-specific storage and/or application-specific processors, respectively.

The server 170 can be/include a compute device medium particularly suitable for data storage purpose and/or data processing purpose and can include, for example, a network of electronic memories, a network of magnetic memories, a server(s), a blade server(s), a storage area network(s), a network attached storage(s), deep learning computing servers, deep learning storage servers, and/or the like. The server 170 can include a memory 172, a communication interface 173 and/or a processor 174 that are structurally and/or functionally similar to the memory 102, the communication interface 103 and/or the processor 104 as shown and described with respect to the image simulation device 101. In some implementations, however, the memory 172 can include application specific storage (e.g., deep learning storage servers) that is structurally and/or functionally different from the memory 102. Similarly, in some implementations, the processor 174 can include application-specific processors (e.g., GPU rack servers) that are structurally and/or functionally different from the memory 102.

In some implementations, the compute device 160 and/or the server device 170 can store the first set of images of the first type and the second set of images of the second type and transmit the first set of images and the second set of images to the image simulation device 101 for generating synthetic images. In some implementations, the compute device 160 and/or the server device 170 can receive the first set of images, the second set of images, and/or the synthetic images to train a machine learning model (e.g., a classification machine learning model, an image recognition machine learning model, a deep learning model, a concurrent machine learning model, and/or the like). For example, the machine learning model can be trained on a set of images of produce without markings and a set of synthetic images of produce generated by the image simulation device 101 that include a marking from a set of images of markings. Once trained, the machine learning model can receive and classify an image as image without marking or image with marking.

In some implementations, the image simulation device 101, the compute device 160, and/or the server device 170 can use the synthetic images to train a classification machine learning model similar to any of the models described in U.S. patent application Ser. No. 17/085,585, entitled "Methods and Apparatus for Training a Classification Model Based on Images of Non-bagged Produce or Images of Bagged Produce Generated by a Generative Model" and filed on Oct. 30, 2020, which is incorporated herein in its entirety by this reference. In some implementations, the image simulation device 101, the compute device 160, and/or the server device 170 can use the synthetic images to train a concurrent machine learning model similar to any of the models described in U.S. patent application Ser. No. 17/127,088, entitled "Methods and Apparatus for Recognizing Produce Category, Organic Type, and Bag Type in an Image Using a Concurrent Neural Network Model", which is incorporated herein in its entirety by this reference.

In some embodiments, the image simulation device 101, the compute device 160, and/or the server device 170 can associate the set of images of the first type (e.g., images of produce) with the set of synthetic images (e.g., simulated images overlaying images of markings on images of produce) to generate a training set. In some instances, association of N images of the first type with N synthetic images can be accomplished by defining an array with 2×N elements including images of the first type and synthetic images in alternating order. For example, odd elements of the array can include the images of the first type and even elements of the array can include the synthetic images. The image simulation device 101 can train a machine learning model using the training set. After the training, the image simulation device 101 can execute the machine learning model to generate a synthetic image (e.g., simulated image of produce) based on an image of a first type (e.g., image of produce different from the images of produce used in the training data). In some instances, the machine learning model can include at least one of a generative adversarial network (GAN), a cycle generative adversarial network (cycleGAN), a convolution neural network (CNN), a fully connected neural network, a residual neural network, and/or the like.

In some implementations, the image simulation device 101, the compute device 160, and/or the server device 170 can associate images of produce with organic type indicators to produce a first training set. The first training set can be added (e.g., concatenated) to a second training set that includes images with category indicators and/or to a third training set that includes bag type indicators. The category indicator can indicate types of produce such as an apple, an orange, etc. The bag type indicator can indicate types of bag such a transparent bag, a paper bag, et. The first training set, the second set, and the third training set can collectively define or generate a fourth training set for training a concurrent machine learning model. The image simulation device 101, the compute device 160, and/or the server device 170 can execute the concurrent machine learning model to receive an image and generate a predicted category indicator of the image, a predicted organic type indicator of the image, and/or a predicted bag type indicator of the image. In one example, the fourth training set can include simulated images with category indicators. In another example, the fourth training set can include simulated images with category indicators and organic indicators. In another example, the fourth training set can include simulated images with category indicators and bag type indicators. Yet in another example, the fourth training set can include simulated images with category indicators, organic indicators, and bag type indicators.

The network 150 can be a digital telecommunication network of servers and/or compute devices. The servers and/or computes device on the network can be connected via one or more wired and/or wireless communication networks (not shown) to share resources such as, for example, data storage and/or computing power. The wired and/or wireless communication networks between servers and/or compute devices of the network 150 can include one or more communication channels, for example, a radio frequency (RF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), any other suitable communication system, and/or a combination of such networks.

Although the image simulation device 101, the compute device 160, and the server 170 are shown and described as singular devices, it should be understood that, in some embodiments, one or more image simulation devices, one or more compute devices, and/or one or more server devices can be used.

Although, the image simulation device 101 is described to process an image of a first type (e.g., image of produce) and an image of the second type (e.g., image of marking) to produce a synthetic image, it should be understood that, in some implementations, the image simulation device 101 can additionally process an image of a third type or any number of image types to generate a synthetic image. For example, in some implementations, the image simulation device 101 can process and image of produce, an image of organic type marking, and an image of expiry data marking to generate a synthetic image.

Figure 2:
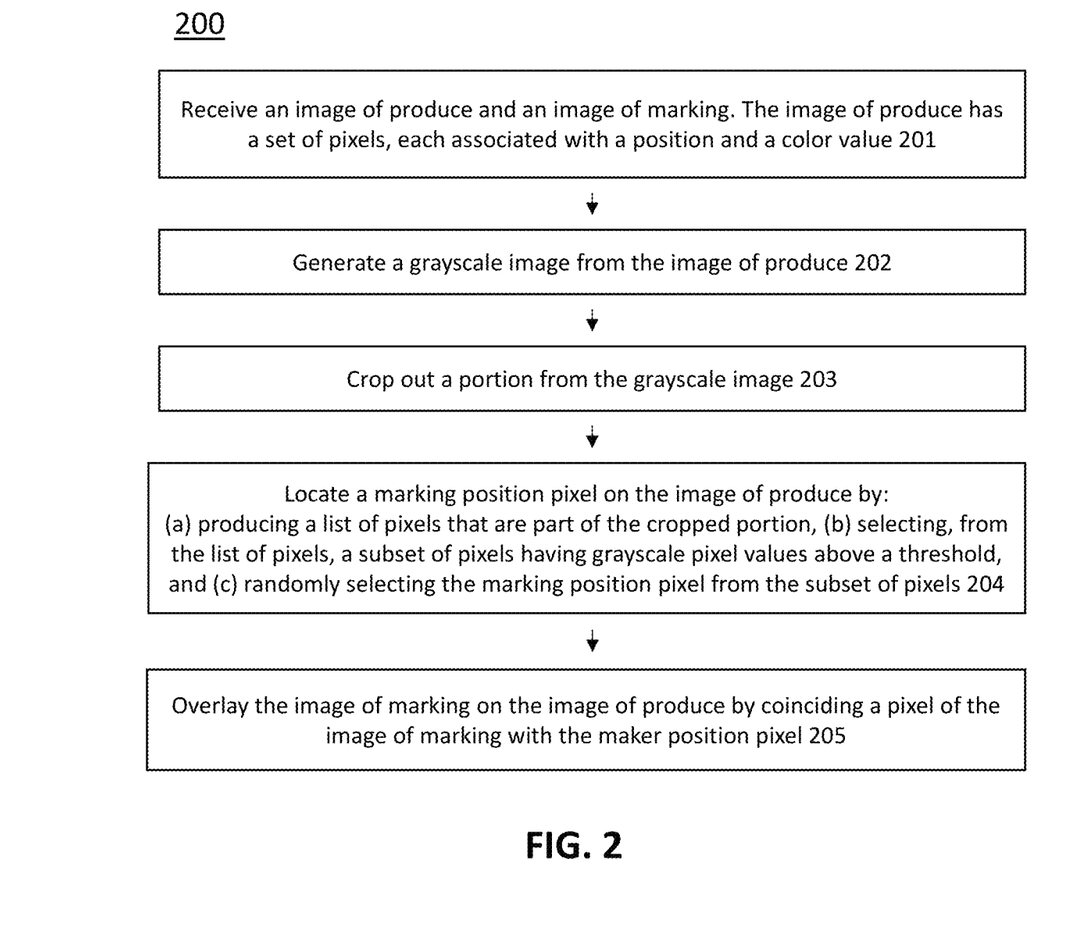
FIG. 2 is a flowchart showing a method of generating a simulated image, according to an embodiment.

FIG. 2 is a flowchart showing a method 200 of image simulation, according to an embodiment. In some implementations, an image simulation device (such as the image simulation device 101 as shown and described with respect to FIG. 1) can be used to perform the method 200. The method 200 can include receiving, at 201, an image of produce and an image of marking. The image of produce has a set of pixels. Each pixel from the set of pixels is associated with a position and a color value.

At 202, the image simulation device can generate a grayscale image from the image of produce. In particular, in some instances, an image preprocessor (such as the image preprocessor 105 as shown and described with respect to FIG. 1) can convert a pixel of an image from the first set of images of the first type to a grayscale pixel of the grayscale image using:

$$Y=0.299R+0.587G+0.114B$$

where Y represents a gray intensity value of a pixel, and R, G, and B represent values for red intensity value, green intensity value, and blue intensity value of that pixel, respectively. At 203, the image simulation device can crop out a portion from the grayscale image. In some instances, the cropped-out portion can be a portion (e.g., a centered portion) of the grayscale image that is determined such that after overlaying an image of marking on a portion of an image of produce corresponding to the cropped-out portion, no pixel from the image of marking will be positioned outside the image of produce.

At 204, the image simulation device can locate a marking position pixel on the image of produce. Locating the marking position pixel involves (a) producing a list of pixels that are part of the cropped-out portion, (b) selecting, from the list of pixels, a subset of pixels having grayscale pixel values above a threshold, and (c) randomly selecting the marking position pixel from the subset of pixels. The list of pixels can be generated from the cropped-out portion of the grayscale image. Each pixel in the list of pixels has a position (e.g., a coordinate) and a grayscale pixel value. The subset of pixels can be selected from the list of pixels by determining a threshold intensity value and selecting pixels having grayscale pixel intensity values above the threshold intensity value. At 205, the image simulation device can overlay the image of marking on the image of produce by coinciding a pixel of the image of marking with the marker position pixel to generate a synthetic image of produce (also referred to herein as the "simulated image of produce").

In some embodiments, the method 200 can optionally include calculating, using a model, a pixel score for each pixel in the list of pixels. The pixel score of a pixel is a metric that can represent that pixel. In one example, the pixel score can be a pixel depth (e.g., an integer between 0 and 255) in grayscale. In another example, the pixel score can be an integer number between −10 and 10 that is calculated by applying an empirical model on R, G, and B intensity values of an RGB encoded image. The model can include a set of parameters that determine the pixel score based on information about each pixel and/or pixels surrounding that pixel. For example, the model can be a linear function that calculates the pixel score based on a red intensity value, a blue intensity value, and/or a green intensity value for each pixel, and a set of constants of the linear function.

In some embodiments, the method 200 can optionally include augmenting the image of produce and/or the image of marking. Augmenting the image of produce and/or the image of marking can involve applying a first noise filter to the image of produce and/or a second noise filter to the image of marking. In some instances, the first noise filter can be the same as the second noise filter. Augmenting the image of produce and/or the image of marking can involve resizing the image of produce to a first preset size and/or the image of marking to a second preset size. In some instances, the first preset size can be the same as the second preset size. Augmenting the image of produce and/or the image of marking can involve skewing the image of produce by a first angle of skew and/or the image of marking by a second angle of skew. In some instances, the first angle of skew can be the same as the second angle of skew. Augmenting the image of produce and/or the image of marking can involve color casting the image of produce by a first color and/or the image of marking by a second color. In some instances, the first color can be the same as the second color. In some implantations, augmenting the image of produce and/or the image of marking can be performed by random noise filters, random preset sizes, random angles of skew, and/or random colors. Such random augmentations can help generate diverse synthetic images that are suitable for training a robust machine learning models.

In some embodiments, once the synthetic image is generated, the method 200 can optionally include detecting an error in the synthetic image of produce. In some instances, the error can be detected and reported by a user of the image simulation device. In some instances, the image simulation device can operate an artificial intelligence that perform anomaly detection on the synthetic image of produce to detect the error. The method 200 can optionally include tuning values of the set of parameters of the model. In some implementations, the method 200 can optionally include tuning values of at least one of the threshold, the first noise filter, the second noise filter, the first preset size, the second preset size, the first angle of skew, the second angle of skew, the first color, or the second color. Tuning the values can be accomplished by performing an arithmetic operation on the values. For example, a value can be tuned by adding an incremental step value to the value. The incremental step value can be a preset (or predetermined) constant step size. In some instances, the incremental step value can be calculated using an optimization algorithm (e.g., Adagrad, Nesterov Accelerated Gradient, and/or the like) and the error (e.g., a quantified magnitude of the error).

Figure 3:
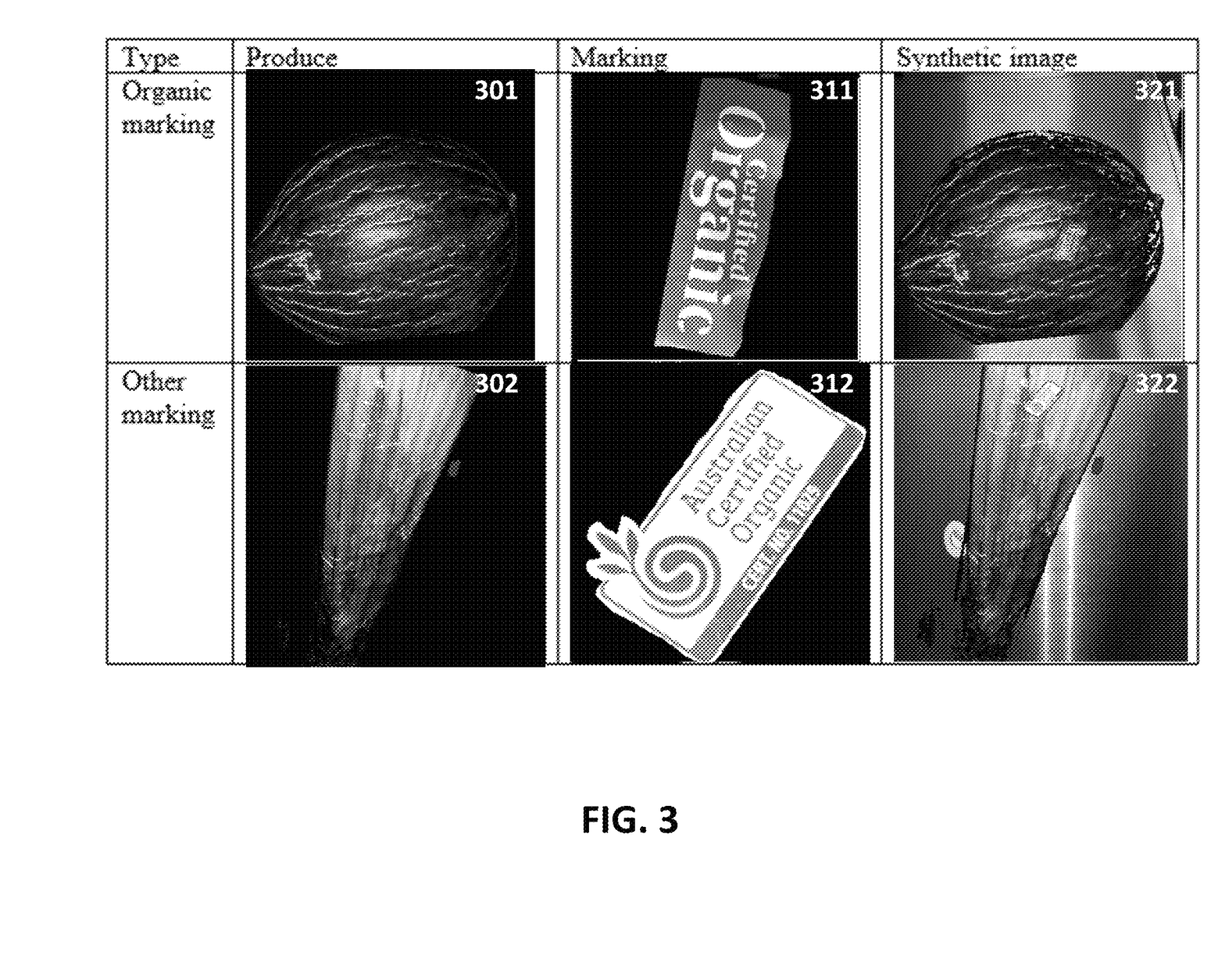
FIG. 3 show examples of simulating synthetic images from images of produce and images of markings, according to an embodiment.

FIG. 3 show examples of simulating synthetic images from images of produce and images of markings, according to an embodiment. As shown, a simulation device (e.g., such as the image simulation device 101 as shown and described with respect to FIG. 1) can be used to generate realistic synthetic images of produce with a marking from an image of produce and an image of marking. FIG. 3 shows images of produce that include an image of a melon 301 and an image of celery 302, and images of markings that include an image of an organic marking 311 and an image of barcode label 312. The simulation device can receive the images produce and images of markings and generate synthetic images that include, for example, an image of the melon with the organic marking 321 and an image of the celery with the barcode label 322.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    receiving at least one image of produce and at least one image of marking, the at least one image of produce having a plurality of pixels, each pixel from the plurality of pixels being associated with a position and at least one color value;
    calculating, for each pixel from the plurality of pixels, a grayscale pixel value from a plurality of grayscale pixel values based on the at least one color value to convert the at least one image of produce to at least one grayscale image of produce;
    cropping out a portion from the at least one grayscale image;
    locating a marking position pixel on the at least one image of produce by:
        (a) producing a list of pixels from the plurality of grayscale pixels that are part of the cropped portion, each pixel in the list of pixels having a position and a grayscale pixel value;
        (b) selecting, from the list of pixels, a subset of pixels having grayscale pixel values above a threshold; and (c) randomly selecting the marking position pixel from the subset of pixels; and overlaying the at least one image of marking on the at least one image of produce by coinciding a pixel of the at least one image of marking with the marker position pixel of the at least one image of produce, to generate at least one simulated image of produce.

2. The method of claim 1, further comprising at least one of the following to augment the at least one image of produce or the at least one image of marking:

applying a first noise filter to the at least one image of produce or a second noise filter to the at least one image of marking, resizing the at least one image of produce to a first preset size or the at least one image of marking to a second preset size, skewing the at least one image of produce by a first angle of skew or the at least one image of marking by a second angle of skew, or color casting the at least one image of produce by a first color or the at least one image of marking by a second color.

3. The method of claim 1, further comprising:

randomly selecting a position of the pixel of the at least one image of marking prior to overlaying the at least one image of marking on the at least one image of produce; and padding the at least one image of marking by a padding size prior to overlaying the at least one image of marking on the at least one image of produce, the padding size being determined at least based on the position of the pixel of the at least one image of marking or a size of the at least one image of marking.

4. The method of claim 1, wherein the at least one image of marking includes at least one image of organic marking or at least one image of inorganic marking.

5. The method of claim 1, wherein the threshold can be determined based on a statistical distribution of grayscale pixel values of the list of grayscale pixels.

6. The method of claim 1, wherein the list of pixels are in order of position of each pixel in the portion, the method further comprising:

generating a weighted subset of pixels based on the subset of pixels and a position of each pixel in the subset of pixel; and randomly selecting the marking position pixel from the weighted subset of pixels.

7. The method of claim 1, further comprising:

associating the at least one image of produce with the at least one simulated image of produce to generate a training set;

training, after overlaying the at least one image of marking on the at least one image of produce, a machine learning model based on the training set;

executing, after the training, the machine learning model to generate a simulated image of produce based on an image of produce.

8. The method of claim 1, wherein the machine learning model includes at least one of a generative adversarial network (GAN), a cycle generative adversarial network (cycleGAN), a convolution neural network (CNN), a fully connected neural network, or a residual neural network.

9. The method of claim 1, further comprising:

associating the at least one simulated image of produce with an organic type indicator to produce a first training set;

adding the first training set to a second training set including a plurality of images with a category indicator from a plurality of category indicators or a third training set including a bag type indicator from a plurality of bag type indicators to generate a fourth training set;

training a machine learning model based on the fourth training set; and executing the machine learning model to generate a predicted category indicator of an image, a predicted organic type indicator of the image, or a predicted bag type indicator of the image.

10. An apparatus comprising:

a memory; and a processor operatively coupled to the memory, the processor configured to:

receive at least one image of produce and at least one image of marking, the at least one image of produce having a plurality of pixels, each pixel from the plurality of pixels being associated with a position and at least one color value;

calculate, for each pixel from the plurality of pixels, a grayscale pixel value from a plurality of grayscale pixel values based on the at least one color value for that pixel to convert the at least one image of produce to at least one grayscale image of produce;

crop out a portion from the at least one grayscale image;

locate a marking position pixel on the at least one image of produce by:

(a) producing a list of pixels from the plurality of grayscale pixels that are part of the portion, each pixel in the list of pixels having a position and a grayscale pixel value;

(b) selecting, from the list of pixels, a subset of pixels having grayscale pixel values above a threshold; and (c) randomly selecting the marking position pixel from the subset of pixels; and overlay the at least one image of marking on the at least one image of produce by coinciding a pixel of the at least one image of marking with the marker position pixel of the at least one image of produce, to generate at least one simulated image of produce.

11. The apparatus of claim 10, the processor further configured to perform at least one of the following to augment the at least one image of produce or the at least one image of marking:

apply a first noise filter to the at least one image of produce or a second noise filter to the at least one image of marking;

resize the at least one image of produce to a first preset size or the at least one image of marking to a second preset size;

skew the at least one image of produce by a first angle of skew or the at least one image of marking by a second angle of skew; or color cast the at least one image of produce by a first color or the at least one image of marking by a second color.

12. The apparatus of claim 10, the processor further configured to:

randomly select a position of the pixel of the at least one image of marking prior to overlaying the at least one image of marking on the at least one image of produce; and pad the at least one image of marking by a padding size prior to overlaying the at least one image of marking on the at least one image of produce, the padding size being determined at least based on the position of the pixel of the at least one image of marking or a size of the at least one image of marking.

13. The apparatus of claim 10, wherein the at least one image of marking includes at least one image of organic marking or at least one image of inorganic marking.

14. The apparatus of claim 10, wherein the threshold can be determined based on a statistical distribution of grayscale pixel values of the list of pixels.

15. The apparatus of claim 10, wherein the list of pixels are in order of position of each grayscale pixel in the portion, the processor further configured to:
generate a weighted subset of pixels based on the subset of pixels and a position of each pixel in the subset of pixel; and
randomly select the marking position pixel from the weighted subset of pixels.

16. The apparatus of claim 10, the processor further configured to:
associate the at least one image of produce with the at least one simulated image of produce to generate a training set;
train, after overlaying the at least one image of marking on the at least one image of produce, a machine learning model based on the training set;
execute, after the training, the machine learning model to generate a simulated image of produce based on an image of produce.

17. The apparatus of claim 10, the processor further configured to:
associate the at least one simulated image of produce with an organic type indicator to produce a first training set;
adding the first training set to a second training set including a plurality of images with a category indicator from a plurality of category indicators or a third training set including a bag type indicator from a plurality of bag type indicators to generate a fourth training set;
train a machine learning model based on the fourth training set; and
execute the machine learning model to generate a predicted category indicator of an image, a predicted organic type indicator of the image, or a predicted bag type indicator of the image.

18. A non-transitory processor-readable medium storing code representing instructions to be executed by a processor, the code comprising code to cause the processor to:
receive at least one image of produce or at least one image of marking, the at least one image of produce having a plurality of pixels, each pixel from the plurality of pixels being associated with a position and at least one color value;
locate a marking position pixel on the at least one image of produce by
(a) producing a list of pixels from the plurality of pixels that are part of the at least one image of produce, each pixel in the list of pixels having a position and a pixel value,
(b) calculating, using a model, a pixel score from a plurality of pixel scores for each pixel in the list of pixels,
(c) selecting, from the list of pixels, a subset of pixels having pixel scores above a threshold and from the plurality of pixel scores, and
(d) randomly selecting the marking position pixel from the subset of pixels; and
overlay the at least one image of marking on the marking position pixel of the at least one image of produce to generate at least one simulated image of produce.

19. The non-transitory processor-readable medium of claim 18, further comprising code to perform at least one of the following to augment the at least one image of produce or the at least one image of marking:
apply a first noise filter to the at least one image of produce or a second noise filter to the at least one image of marking,
resize the at least one image of produce to a first preset size or the at least one image of marking to a second preset size,
skew the at least one image of produce by a first angle of skew or the at least one image of marking by a second angle of skew, or
color cast the at least one image of produce by a first color or the at least one image of marking by a second color.

20. The non-transitory processor-readable medium of claim 19, further comprising code to:
detect an error in the at least one simulated image of produce; and
tune values of at least one of a parameter of the model, the threshold, the first noise filter, the second noise filter, the first preset size, the second preset size, the first angle of skew, the second angle of skew, the first color, or the second color.

* * * * *